Patented Dec. 14, 1948

2,456,344

UNITED STATES PATENT OFFICE 2,456,344

POLYAMIDES PLASTICIZED WITH A MIXTURE OF PHENOL AND ESTER TYPE PLASTICIZERS

Gordon T. Vaala, Wilmington, Del., assignor to E. I. du Pont de Nemours & Company, Wilmington, Del., a corporation of Delaware No Drawing. Application May 1, 1945,
Serial No. 591,422

9 Claims. (Cl. 260—31.8)

This invention relates to new compositions of matter and more particularly to improved plasticized superpolyamides.

This application is a continuation in part of my application Serial No. 410,347, filed September 10, 1941, now abandoned.

The polyamides from which the present improved compositions are made are the synthetic linear polyamides of the general type disclosed in U. S. Patents 2,071,250, 2,071,253 and 2,130,948. The polymers there described are high molecular weight products, usually having an intrinsic viscosity (as defined in the last mentioned patent) of at least 0.4, which can be cold drawn into strong, continuous, pliable textile fibers showing by X-ray examination orientation along the fiber axis. These polyamides, generally speaking, comprise the reaction product of a polyamide-forming composition in which the molecules are bifunctional and contain two amide-forming groups, each of which is complementary to an amide-forming group in other molecules in said composition.

The polyamides as defined above or as otherwise identified hereinafter can be obtained, for example, by self-polymerization of monoamino-monocarboxylic acids, or by reacting in substantially equimolecular proportions a dibasic carboxylic acid with a diamine or with a monoamino-monohydric alcohol. Likewise, interpolyamides can be obtained by reacting two or more diamines with one or more dibasic carboxylic acids, or by reacting two or more dibasic carboxylic acids with one or more diamines or by polymerizing a mixture of two or more monoaminomonocarboxylic acids, or of one or more of these amino acids with at least one diamine and at least one dibasic carboxylic acid. These linear polyamides include also polymers obtained by admixture of other linear polymer-forming reactants, as for instance glycol-dibasic acid mixtures in the case of polyester-amides, with the mentioned polyamide-forming reactants. In either instance the amide group is an integral part of the main chain of atoms in which the average number of atoms separating the amide groups is preferably at least two. On hydrolysis with hydrochloric acid the amino acid polymers yield the aminoacid hydrochloride, the diamine-dibasic acid polymers yield the diamine hydrochloride and the dibasic carboxylic acid, and the amino alcohol-dibasic acid polymers yield the amino alcohol hydrochloride and the dibasic carboxylic acid.

For many uses, such as in transparent wrapping foil, and in coatings for fabrics, it is desirable that the polyamides be highly pliable and resilient, and that these properties be maintained over a wide temperature range. On the other hand, the polyamide composition should not soften or become tacky at room temperature or at temperatures somewhat above. Acceptable compositions must also be resistant to failure on repeated flexing at both normal and subnormal temperatures.

Among the more useful plasticizing agents previously proposed for the polyamides are various phenols. Polyamides containing a relatively high percentage of the phenol plasticizer agents are very soft and pliable, but this pliability is lost to a point of extreme brittleness at low temperatures. The phenol plasticized polyamides are in addition generally tacky and low melting.

I have discovered that when the polyamides are plasticized with a mixture comprising a phenol plasticizer and a compound of the kind described below, the polyamide products obtained are markedly improved with regard to flexibility at low temperatures and with regard to freedom from tack.

This invention has as an object the production of improved polyamide compositions. A further object is the preparation of improved plasticized polyamide compositions and articles made therefrom which are highly pliable with retention of pliability over a wide temperature range, and which do not become tacky at moderately elevated temperature. Other objects will appear hereinafter.

These objects are accomplished by incorporating in the polyamide a mixture of plasticizing substances, one of which is a phenol plasticizer and the other of which is a compound which consists of a neutral carboxylic acid ester of a hydroxy acid ester which will be more fully described hereinafter.

This neutral ester which, with the phenol plasticizer, is an essential component of the present plasticizing mixture, is a completely esterified ester of a carboxylic acid, in which ester at least one of the alcohol residues is an aliphatic carboalkoxy alcohol wherein the organic radical connecting the alcoholic hydroxyl and the carboalkoxy group contains not more than 6 carbon atoms. The esters of this kind most advantageously used in the present invention are those in which the carboxylic acid is a dicarboxylic acid. These compounds are preferably those of the formula $R_1OCORCOOR_2COOR_3$, where $R$ is a divalent hydrocarbon radical, $R_2$ is a divalent hydrocarbon radical of not more than 6 carbon atoms and $R_1$ and $R_3$ are substituents selected from the group consisting of monovalent hydrocarbon radicals and monovalent hydrocarbon radicals bearing ether groups. An example of these esters is the monobutyl phthalate ester of butyl glycolate, or butyl carbobutoxymethyl phthalate, of the formula $C_4H_9OCOC_6H_4COOCH_2COOC_4H_9$.

Another type of ester useful in the present compositions is that of the formula $$R_1OCOR_4OCORCOOR_2COOR_3$$

in which the indicated radicals are as given above and in which $R_4$ is defined as given for $R_2$. An example of a compound of this kind is di-(carboisobutoxymethyl) maleate, $$(CH_3)_2CHCH_2OCOCH_2OCOCH=\\CHCOOCH_2COOCH_2CH(CH_3)_2$$

A still further type of the previously defined esters is that represented by the formula $R_5COOR_2COOR_1$ where $R_1$ and $R_2$ are as defined above and $R_5$ is a monovalent hydrocarbon radical. A compound of this kind is carboethoxymethyl palmitate $CH_3(CH_2)_{14}COOCH_2COOC_2H_5$. The esters represented by the several formulae given above can be prepared by the usual methods employed in the preparation of hydroxy acids.

The phenol plasticizers used in conjunction with the neutral esters defined above include a large number of readily available phenolic compounds which are known to be useful as plasticizers for the polyamides. The unusual balance of properties previously referred to which is obtained in the polyamide compositions by the present mixture of ester and phenol plasticizer is not obtained by replacing the ester defined above with other neutral esters. The use alone of either of the two agents which form the present plasticizing mixture is also ineffective in accomplishing the objectives of this invention.

The total quantity of the plasticizing mixture and the proportion of the neutral carboxylic acid ester of a hydroxy acid ester contained in the mixture will vary depending upon the properties desired in the final product. For most purposes the total quantity of the plasticizer ranges from 10% to 150% by weight of the polyamide, and the quantity of the carboxylic ester ranges from about 25% to 100% of the phenol plasticizer. These proportions, however, can be as low as 10% or as high as 150% with noticeable improvement in the properties of the polyamide. A convenient method for incorporating these materials in the polyamides consists in dissolving the blend of plasticizers and the polyamide in a mutual solvent. Such solutions can be used to make filaments, films, rods, and the like by evaporative or coagulative methods. Lower fatty acids, for example, formic acid, are useful solvents for this purpose. Mixtures of chloroform and methanol, or ethanol and water are especially useful solvents for the polyamide interpolymers. These plasticizers blends can also be incorporated with the polyamides by a melt blending technique, especially if blended rapidly.

The invention is described more specifically in in the following examples in which parts are by weight.

*Example I*

The polyamide used in this example is the interpolyamide obtained by reacting hexamethylenediammonium adipate, hexamethylenediammonium sebacate (these compounds are the salts of the diamines and dibasic acids) and caprolactam in a 40:30:30 ratio. This polymer has a melt viscosity of 12,971 poises at 250° C. and melts at 160° C.

One thousand seven hundred seventy parts of this interpolymer, 708 parts of a phenolic solvent-type plasticizer consisting of 1, 12-di-(hydroxyphenyl) octadecane (prepared by condensing an excess of phenol with 1, 12-octadecanediol in the presence of zinc chloride, boron trifluoride, or hydrogen fluoride as described in U. S. Patent 2,321,620), and 472 parts of a non-solvent plasticizer consisting of butyl carbobutoxymethyl phthalate are dissolved in 4220 parts of 95% ethanol and 594 parts of water by heating with stirring under reflux at 60°–70° C. for about 40 hours. The resultant solution, designated as composition A, is subsequently applied to fabric as the anchor coat.

A second solution for the subsequent coats which is similar to the above but contains pigment and which is designated as composition B is prepared by dissolving 7630 parts of the same interpolyamide and 2139 parts of the same solvent plasticizer in a solvent mixture consisting of 18,550 parts of 95% ethanol and 2530 parts of water by stirring and warming under reflux at 60°–65° C. for about 12 hours. A mixture of 2031 parts of the non-solvent ester plasticizer mentioned above, 272 parts of carbon black, and 907 parts of the solvent plasticizer is added to this solution and heating and stirring are continued for an additional 8 hours.

The anchor coat is applied to black sateen fabric by spreading two coats of composition A. Four coats of composition B are then applied, each coat being followed by a drying at 190° F. The coated fabric is skivered on a standard skiver roll and nine more coats of composition B are applied. The coating weight is 10.5 oz. per 50" yard. The coated fabric has an especially attractive surface closely resembling that of finished leather.

As previously indicated, the improved products of this invention are not obtained by replacing the non-solvent carboxylic ester plasticizer with other neutral esters or by using separately the plasticizer contained in the mixture of plasticizers used in the practice of this invention. Although the phenols yield valuable plasticized polyamide compositions useful for many purposes, certain products, particularly those in which these compositions are in the form of a film, possess to a markedly lesser degree the properties possessed by the present compositions which especially adapt them to the manufacture of wrapping foils, coated fabrics and other film products.

For example, when the coated fabric of Example I is compared with a second fabric differing only in that the neutral ester plasticizing component is replaced by a propylene glycol-castor oil ester interchange product, the first fabric, as determined on the test machine by the number of flexes before failure, has almost doubled flex value at low temperature (6°–8° F.) and also after outdoor exposures of 4 weeks; its scrub value is greater; and its exudation and cold crack temperatures are 135° C. and —22° F. whereas these values in the second fabric are but 110° C. and —13° F. respectively. A marked improvement is also shown in the scrub, cold crack and mar temperatures of a fabric similar to that of Example I as compared to a like prepared fabric in which the plasticizer consisted solely of the same phenolic solvent plasticizer. The flex values referred to above are determined on the Schiltknecht flex machine. The scrub test given above is described in Automotive Industries, 49, 1262-6. Further instances of improved plasticized polyamide compositions obtained by the practice of this invention are given in the examples below.

*Example II*

Ten parts of the interpolymer described in Example I, 6 parts of a phenol plasticizer consisting of 2-(4-butoxyphenyl)-2-(4-hydroxyphenyl)propane and 4 parts of butyl carbobutoxymethyl phthalate are dissolved in 53 parts by weight of a mixture of equal volumes of chloroform and methanol by stirring at 60° C. for two hours. The solution is cooled to room temperature and a film is cast by flowing the solution on a glass plate and removing the solvent. The last traces of solvent are removed by aging at 65° C. for four hours. The film softens at 150° C. and has a dry, non-tacky feel. The tensile value, based on the original dimensions of the film, is 1476 pounds per sq. in. For comparison, a second film is prepared in exactly the same manner from 10 parts of interpolymer and 10 parts of the above phenol plasticizer. This film softens at 129° C. and is tacky. The tensile value, based on the original dimensions of this film, is 1246 pounds per sq. in. The film containing butyl carbobutoxymethyl phthalate is not cracked when dealt a severe blow at temperatures as low as —22° F., but the film containing no butyl carbobutoxymethyl phthalate cracks when dealt a severe blow at +5° F.

The 2-(4-butoxyphenyl)-2-(4-hydroxyphenyl) propane of this example is prepared by dissolving 28 parts of sodium hydroxide and 160 parts of 2,2-di(4-hydroxyphenyl)propane in 300 parts of water and adding, in the course of one hour, 96 parts of butyl bromide to the solution maintained at 40° C. The mixture is then heated for half an hour at 100° C. and finally refluxed for 2 hours. The reaction product is dissolved in benzene, the benzene solution is washed four times with water, dried and distilled. There is obtained 170 parts (86% yield) of 2-(4-butoxyphenyl)-2-(4-hydroxyphenyl) propane boiling at 180–198° C. (chiefly 195° C.) at 2 mm. pressure, having a refractive index at 25° C. of 1.5624 and a hydroxyl number of 222.

*Example III*

Ten parts of the interpolymer described in Example I is dissolved in 55 parts by weight of a mixture of equal volumes of chloroform and methanol by stirring at 60° C. for two hours. Six parts of 1,12-di-(hydroxyphenyl)octadecane and 4 parts of di-(carboisobutoxymethyl)maleate are added to the solution with stirring. The solution is cooled to room temperature and a film cast as in Example II. The film is stripped from the plate and final traces of solvent are removed from the film by heating at 65° C. for four hours. The film thus prepared melts at 158°–160° C., has an elongation of 324% and a tensile value of 1565 pounds per sq. in. based on original dimensions. The film is not cracked at —4° F. when dealt a severe blow.

The di-(carboisobutoxymethyl)maleate of this example is prepared by refluxing for 10 hours a mixture of 147 parts of maleic anhydride, 528 parts of isobutyl hydroxyacetate, 300 parts of benzene and 4 parts of concentrated sulfuric acid in an apparatus designed for removing the water formed and returning the benzene to the reaction mixture. After neutralizing the acid catalyst, the crude reaction mixture is fractionated and there is obtained 135 parts of di-(carboisobutoxymethyl)maleate boiling at 190° C. at 1 mm. pressure, together with a lower boiling fraction which is chiefly the monoesterification product.

*Example IV*

Ten parts of the interpolymer described in Example I, 4 parts of 1,12-di-(hydroxyphenyl) octadecane and 2.7 parts of butyl carbobutoxymethyl phthalate are dissolved in 60 parts by weight of a mixture of chloroform and methanol (2 volumes of chloroform to 1 of methanol) by stirring at 60° C. for two hours. The solution is cooled to room temperature and a film is cast as in Example II. The last traces of solvent are removed by aging at 65° C. for four hours. For comparison, a second film is prepared in exactly the same manner from 10 parts of the interpolymer, 4 parts of 1,12-di-(hydroxyphenyl) octadecane and 2.7 parts of dibutyl phthalate. This second film will not withstand 134,000 flexes on the Schiltknecht flex machine while the film containing butyl carbobutoxymethyl phthalate shows no failures after 164,000 flexes.

*Example V*

Ten parts of an interpolyamide, which is obtained by reacting 60 parts of hexamethylenediammonium adipate and caprolactam and which melts at 170°–175° C. and has a melt viscosity of 2200 poises at 250° C., is dissolved in 53 parts of a mixture of equal volumes of chloroform and methanol by stirring at 60° C. for two hours. Six parts of 1,12-di-(hydroxyphenyl) octadecane and 4 parts of butyl carbobutoxymethyl phthalate are now added to the solution with stirring. The solution is cooled to room temperature and a portion poured onto a glass plate. By means of a leveling blade the solution is spread to an even layer and the solvent allowed to evaporate at room temperature. Final traces of solvent are removed from the film by heating at 65° C. for fifteen hours.

The unusual high retention of resistance to failure on repeated flexing of the present polyamide films on aging is shown by the fact that the film of the above example has initially a tensile strength of 1300 pounds per sq. in. and a 221% elongation, and after an outdoor exposure of 28 days retains more than 95% of its original tensile strength and more than 75% of its original percentage elongation. On the other hand, a film similarly made but differing only in that the phenol plasticizing component is replaced by an equal proportion of a sulfonamide plasticizer, namely, amylbenzenesulfonamide, is too brittle for this test after the same time of outdoor exposure, although the mixture of sulfonamide and above defined completely esterified ester of a carboxylic acid also has been found to yield a polyamide film having approximately the same high initial values for tensile strength and percentage elongation.

*Example VI*

Ten parts of an interpolyamide similar to that described in Example I, having a melt viscosity of 9092 poises at 250° C. and melting at 160° C., 5 parts of 1,12-di-(hydroxyphenyl) octadecane, and 5 parts of butyl carbobutoxymethyl phthalate are dissolved in 27 parts of 95% ethyl alcohol by stirring at 75° C. for four hours. A portion of the solution is poured on a glass plate heated to 65° C. By means of a leveling blade the solution is spread to an even layer. The plate is then placed in an oven heated to 65° C. for four hours to evaporate the solvent. The film is removed from the plate and the last traces of solvent are removed by heating at 65° C. for six hours. The tensile value, based on the original dimensions of the film, is 1900 pounds per sq. in., and the percentage elongation is 460%. This film will withstand an average of 4,200,000 flexes before failing and will not crack when subjected to a sharp blow at temperatures as low as −25° F.

*Example VII*

The polyamide in this example is the interpolyamide obtained by reacting hexamethylenediammonium adipate and 12-aminostearic acid in a 50:50 ratio. This polymer has an intrinsic viscosity of 1.07 and melts at 167° C.

One hundred parts of this interpolyamide is dissolved in 450 parts of a mixture of equal volumes of chloroform and methanol by warming and stirring. To this solution are added with stirring 40 parts of 1,12-di-(hydroxyphenyl) octadecane and 27 parts of butyl carbobutoxymethyl phthalate. The solution is cooled to room temperature and a film is cast as described in Example II. It is stripped from the glass plate and final traces of solvent removed from the film by aging at 65° C. for fifteen hours. The film thus prepared melts at 158° C., has a tensile strength of 1585 pounds per sq. in. based on the original dimensions, and a percentage elongation of 291%.

*Example VIII*

Ten parts of the interpolymer described in Example I, 6 parts of 1,12-di-(hydroxyphenyl) octadecane, and 4 parts of carbobutoxymethyl octanoate are dissolved in 53 parts by weight of a mixture of equal volumes of chloroform and methanol by stirring at 60° C. for two hours. A film is cast as in Example II. The film is stripped from the plate and final traces of solvent are removed from the film by heating at 65° C. for four hours. The clear pliable film thus prepared melts at 150°–152° C., has an elongation of 386% and a tensile value of 2020 pounds per sq. in. based on the original dimensions. The film is not cracked at −35° F. when dealt a severe blow.

The carbobutoxymethyl octanoate of this example may be prepared in the same manner as the di-(carboisobutoxymethyl)maleate of Example III, using 264 parts of butyl hydroxyaceate and 288 parts of octanoic acid.

*Example IX*

The polyamide used in this example is the interpolyamide obtained by reacting hexamethylenediammonium adipate, hexamethylenediammonium sebacate, and the salt prepared from equivalent amounts of piperazine and adipic acid, in a 25:30:45 ratio. This polymer has an intrinsic viscosity higher than 1.0 and melts at 185°–192° C.

One hundred parts of this interpolyamide is dissolved in 530 parts of a mixture of chloroform and methanol (2:1 by volume). To this solution are added with stirring 40 parts of 1,12-di-(hydroxyphenyl) octadecane and 27 parts of butyl carbobutoxymethyl phthalate. The solution is cooled to room temperature and a film cast as described in Example II. It is stripped from the glass plate and final traces of solvent removed from the film by aging at 65° C. for fifteen hours. The film thus prepared is brilliantly clear and extremely pliable. It has a tensile strength of 2400 pounds per sq. in., based on the original dimensions of the film and a percentage elongation at break of 450%. The film is not cracked when dealt a severe blow at temperatures as low as −58° F. One sample of the film (5 mils thick) withstands 7,200,000 flexes on the Schiltknecht flex machine before failing (i. e., before a pinhole developed in the sample.

*Example X*

Ten parts of the interpolymer described in Example VI and having a melt viscosity of 9092 poises at 250° C. is dissolved in 53 parts of a mixture of equal volume of chloroform and methanol by stirring at 60° C. for two hours. Eight parts of methyl 10-(hydroxyphenyl) stearate and 2 parts of butyl carbobutoxymethyl phthalate are added to the solution with stirring. The solution is cooled to room temperature and a film cast as in Example II. The film is stripped from the plate and the final traces of solvent are removed from the film by heating at 65° C. for four hours. The film thus prepared melts at 158°–160° C., has an elongation of 296% and a tensile value of 1092 pounds per sq. in. based on the original dimensions. The film is not cracked at −25° F. when dealt a severe blow.

The methyl-10-(hydroxyphenyl) stearate of this example is prepared as follows: To a mixture of 140 parts of methyl oleate and 60 parts of phenol is added gradually with stirring 20 parts of a 40% solution of boron trifluoride in methanol. The mixture is heated at 100° C. for one hour under an air condenser in an atmosphere of nitrogen, then at 130–140° C. for an additional two hours. The reaction product is then diluted with benzene and washed with an aqueous solution of sodium bicarbonate until neutral. After this washing, the organic layer is treated with 15 parts of decolorizing carbon, filtered through kieselguhr and the volatile components and unreacted phenol are removed by heating at 150° C. at 0.7 mm. pressure. The residue (163 parts) is methyl 10-(hydroxyphenyl) stearate. The product boils at 230° C. at 1 mm. pressure and has a refractive index at 25° C. of 1.4955.

The mixtures of plasticizers disclosed herein can be used with any of the polyamides of the kinds described in the above mentioned patents which are subject of improvement by the use of plasticizing agents. Because of their greater inherent flexibility in the polymer as it is initially formed, it is preferred to use the interpolyamides obtained from a mixture of at least two different polyamide-forming compositions rather than the straight polyamides. This mixture can contain two or more different diamines and one or more dibasic carboxylic acids or vice-versa, or can consist of two different monoaminomonocarboxylic acids, or of a mixture of at least one amino acid with at least one diamine and at least one dibasic carboxylic acid. Other linear polymer-forming reactants can also be included in the composition from which the polyamide is made. It is to be understood that reference herein to the amino acids, dibasic carboxylic acids, and diamines is intended to include the equivalent amide-forming derivatives of the amino acids, the dicarboxylic acids, and the diamines. Amide-forming derivatives of the amino acids include the ester, anhydride, amide, lactam, acid halide, N-formyl derivatives, carbamate, and nitrile in the presence of water. Amide-forming derivatives of the dibasic carboxylic acids comprise the mono- and di-ester, the anhydride, the mono- and di-amide, acid halide, and the following compounds in the presence of water: nitrile, cyanocarboxylic acid, cyanoamide, and cyclic imide. Amide-forming derivatives of the diamines include the carbamate, N-formyl derivative and the N,N'-diformyl derivative.

Examples of particular polyamides that may be mentioned as useful in the practice of this invention are polyhexamethylene adipamide, polyhexamethylene sebacamide, polydecamethylene adipamide, polydecamethylene sebacamide, polytetramethylene adipamide, the polyamides obtained from either 1,4-xylene diamine or metaphenylenediamine with either adipic or sebacic acids, the polyamides obtained from 6-aminocaproic acid and 12-aminostearic acid, the polyamides obtained by reacting adipic or sebacic acid with monoethanol amine, the interpolyamides obtained from mixtures of hexamethylenediamine, adipic acid and 6-aminocaproic acid, the interpolyamides obtained from mixtures of hexamethylenediamine, adipic acid, sebacic acid and 6-aminocaproic acid, etc.

Additional examples of the neutral carboxylic acid esters are:

Ethyl carboethoxymethyl phthalate
$C_2H_5OCOC_6H_4COOCH_2COOC_2H_5$
Isobutyl carboisobutoxymethyl phthalate
$(CH_3)_2CHCH_2OCOC_6H_4COOCH_2COOCH_2CH(CH_3)_2$
Di-(carboisobutoxymethyl)phthalate
$(CH_3)_2CHCH_2OCOCH_2OCOC_6H_4COOCH_2COOCH_2CH(CH_3)_2$
Butyl carbobutoxymethyl adipate
$C_4H_9OCO(CH_2)_4COOCH_2COOC_4H_9$
Ethyl carboethoxymethyl sebacate
$C_2H_5OCO(CH_2)_8COOCH_2COOC_2H_5$
Di-(carboisobutoxymethyl)adipate
$(CH_3)_2CHCH_2OCOCH_2OCO(CH_2)_4COOCH_2COOCH_2CH(CH_3)_2$
Di[carbo-(2-methoxyethoxy) methyl]sebacate
$CH_3OCH_2CH_2OCOCH_2OCO(CH_2)_8COOCH_2COOCH_2CH_2OCH_3$
Isobutyl carboisobutoxymethyl maleate
$(CH_3)_2CHCH_2OCOCH=CHCOOCH_2COOCH_2CH(CH_3)_2$
Di-(carboethoxymethyl)maleate
$C_2H_5OCOCH_2OCOCH=CHCOOCH_2COOC_2H_5$
Amyl carboamyloxymethyl oxalate
$C_5H_{11}OCOCOOCH_2COOC_5H_{11}$
Di-(carbomethoxymethyl)oxalate
$CH_3OCOCH_2OCOCOOCH_2COOCH_3$
2-methoxyethyl[carbo-2-(-methoxyethoxy)methyl]succinate
$CH_3OCH_2CH_2OCO(CH_2)_2COOCH_2COOCH_2CH_2OCH_3$
Cyclohexyl carbocyclohexyloxymethyl azelate
$C_6H_{11}OCO(CH_2)_7COOCH_2COOC_6H_{11}$
Di-(carbopropoxymethyl)azelate
$C_3H_7OCOCH_2OCO(CH_2)_7COOCH_2COOC_3H_7$
Methyl carbobutoxymethyl malonate
$CH_3OCOCH_2COOCH_2COOC_4H_9$
Di-(carbobenzoxymethyl)malonate
$C_6H_5CH_2OCOCH_2OCOCH_2COOCH_2COOCH_2C_6H_5$
Carboethoxymethyl palmitate
$CH_3(CH_2)_{14}COOCH_2COOC_2H_5$
Carboisobutoxymethyl benzoate
$C_6H_5COOCH_2COOCH_2CH(CH_3)_2$
Carbobutoxymethyl octanoate
$CH_3(CH_2)_6COOCH_2COOC_4H_9$
Butyl 1-(carbobutoxy)ethyl phthalate
$C_4H_9OCOC_6H_4COOCHCOOC_4H_9$
|
$CH_3$
Isobutyl 1-(carboisobutoxy)ethyl adipate
$(CH_3)_2CHCH_2OCO(CH_2)_4COOCHCOOCH_2CH(CH_3)_2$
|
$CH_3$ Isobutyl 1-(carbobutoxy)propyl phthalate
$(CH_3)_2CHCH_2OCOC_6H_4COOCH-COOC_4H_9$
|
$C_2H_5$
Methyl (1-carboethoxy-1-methyl)ethyl phthalate
$CH_3$
|
$CH_3OCOC_6H_4COOC-COOC_2H_5$
|
$CH_3$
Ethyl (2-carboethoxy)ethyl phthalate
$C_2H_5OCOC_6H_4COOCH_2CH_2COOC_2H_5$ Some of these materials are available commercially. These esters may be prepared in accordance with the directions given in U. S. Patents 2,072,739; 2,073,937; 2,120,755; 2,120,756 and 2,260,295.

Phenol plasticizers in addition to those used in the examples include 2,2-di-phenylol-propane, 1,3 - di - (hydroxyphenyl)-propane, 1,6-di-(hydroxyphenyl)hexane, 2,9 - di-(hydroxyphenyl) decane, 2 - methoxyphenyl-2-phenylolpropane, diamylphenol, octylphenol, 2-chloro-4,6-di-tertiary amylphenol, p-cyclohexylphenol, 2,6-dichloro - 4 - tertiary amylphenol, dibenzylphenol, methyl - 10 - (hydroxyphenyl) stearate, methyl-10,13 - di - (hydroxyphenyl) stearate, bis-[(hydroxyphenyl) ethoxy]-ethane, 2,2'-bis-[(hydroxyphenyl) - ethoxy] - ethyl ether, 10-(hydroxyphenyl)stearonitrile, beta beta' - di - (hydroxyphenyl)-diethyl ether, 2-(4'-ethoxyphenyl)-2-(hydroxyphenyl) propane, 2-hydroxyethyl-10-(hydroxyphenyl)stearate, 10 - (hydroxyphenyl)-stearyl-10-(hydroxyphenyl)stearate, 1,1-bis-(hydroxyphenyl) - cyclohexane, 1,1-bis-(hydroxyphenyl)heptane and hydroxyphenyl pentane. These phenols may be prepared by methods well known in the art. Many of them are available commercially.

Phenolated fatty acid esters are useful plasticizers of the phenolic type. Among the materials which may be phenolated to yield derivatives of this general kind are castor oil, olive oil, cottonseed oil, soya bean oil, peanut oil, allyl oleate, linseed oil, corn oil, rapeseed oil, oiticica oil, tung oil, China-wood oil, palm oil and tea seed oil. These phenolated fatty acid esters, which may more accurately be termed alkyl esters of fatty acids containing a hydroxyphenyl nucleus attached to the acid residue, and in particular, the phenolated fatty esters of such unsaturated esters as methyl oleate, ethyl elaidate, butyl oleate, amyl undecylenate, ethyl erucate, butyl linoleate, methyl linoleate and propyl licanate (licanic acid is the acid

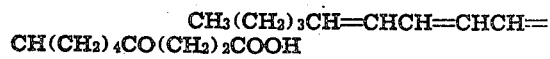

obtained by hydrolysis of oiticica oil) are particularly valuable in the process of this invention. The phenolated products obtained from mixtures of these esters are also extremely useful.

The phenolated fatty acid esters may be prepared, in accordance with the general method described in Example X, by condensing a phenol with an ester of an unsaturated fatty acid in the presence of a catalyst such as boron trifluoride, zinc chloride, sulfuric acid etc. Examples of this general reaction are given in U. S. Patents 2,154,850 and 2,246,762. The esters may also be prepared by esterifying the free acids which may be obtained by the process of U. S. Patent 2,082,459.

The plasticized polyamide compositions of this invention yield films which possess remarkable resistance to failure on repeated flexing at both normal and subnormal temperatures. These polyamide compositions are, furthermore, surprisingly pliable and still hard and dry on the surface. In contrast to most plasticized polyamide films and coated fabrics, the compositions of this invention are highly resistant to the action of steam, a property of paramount importance in the lasting of shoes with fabrics coated with plasticized polyamides.

Polyamides plasticized with a mixture of a phenol and a neutral carboxylic acid ester of a hydroxy acid ester show a number of advantages over those compositions containing a mixture of non-phenolic solvent and non-solvent type plasticizer. The former compositions have outstanding flex durabilities and show much better resistance towards outdoor weathering. In addition, the softening temperatures of the phenolic compositions are generally somewhat higher, which is a decided advantage for certain uses.

A large variety of improved polyamide products are obtained from the new compositions disclosed herein. Typical applications are yarns, fabrics, bristles, surgical sutures, fishing leaders, fishlines, dental floss, rods, tubes, films, ribbons, sheets, safety glass interlayers, molded articles, adhesives, electrical insulations for wires, impregnating agents, and coating compositions for cloth, paper, leather, metal and wood. They are useful for impregnating or coating cloth, followed by calendering or pressing for use as collar interliners. Fabrics coated with the compositions of this invention are especially useful in the fabrication of shoes and upholstery where pliability and resistance to failure on repeated flexing are essential. Valuable products in film form obtained from the present compositions are, wrapping foils, leather applications, raincoats, shower curtains, and umbrellas. By reason of the fact that superpolyamide blends of this invention may be melted and thus extruded, they can be formed into tubing or coated directly onto fabrics and metals. The compositions are also useful in the preparation of blown articles such as toys, hollow toiletware, etc. Furthermore, they may be compression molded, for example, blanked or stamped out into shaped articles.

As many apparently widely different embodiments of this invention may be made without departing from the spirit and scope thereof, it is to be understood that I do not limit myself to the specific embodiments thereof except as defined in the appended claims.

I claim:

1. A composition of matter comprising a synthetic linear polyamide having an intrinsic viscosity of at least 0.4 plasticized with a mixture comprising a monomeric phenol plasticizer and a completely esterified ester of a carboxylic acid wherein the carboxyl carbon is attached to a hydrocarbon radical in which ester at least one carboxyl group of said carboxylic acid is esterified with an aliphatic carboalkoxy alcohol wherein the radical connecting the alcoholic hydroxyl and the carboalkoxy group is a saturated hydrocarbon radical and contains not more than 6 carbon atoms, any remaining carboxyl group not so esterified being esterified with an alcohol the non-hydroxyl portion of which is hydrocarbon, said polyamide on hydrolysis with hydrochloric acid yielding material selected from the group consisting of (a) monoaminomonocarboxylic acid hydrochloride, (b) a mixture of a diamine hydrochloride and dibasic carboxylic acid, and (c) a mixture of monoaminomonohydric alcohol hydrochloride and dibasic carboxylic acid, said mixture of phenol plasticizer and said ester being present in said composition of from 10% to 150% by weight of said polyamide, and said ester being present in said mixture in amount of from 25% to 100% by weight of said phenol plasticizer.

2. A composition of matter comprising a synthetic linear polyamide having an intrinsic viscosity of at least 0.4 plasticized with a mixture comprising a monomeric phenol plasticizer and a completely esterified ester of a carboxylic acid of the formula $R_1OCORCOOR_2COOR_3$ in which R is a divalent hydrocarbon radical, $R_2$ is a divalent hydrocarbon radical of not more than 6 carbon atoms, and in which $R_1$ and $R_3$ are monovalent saturated hydrocarbon radicals, said polyamide on hydrolysis with hydrochloric acid yielding material selected from the group consisting of (a) monoaminomonocarboxylic acid hydrochloride, (b) a mixture of diamine hydrochloride and dibasic carboxylic acid, and (c) a mixture of monoaminomonohydric alcohol hydrochloride and dibasic carboxylic acid, said mixture of phenol plasticizer and said ester being present in said composition of from 10% to 150% by weight of said polyamide, and said ester being present in said mixture in amount of from 25% to 100% by weight of said phenol plasticizer.

3. A composition of matter comprising a synthetic linear polyamide having an intrinsic viscosity of at least 0.4 plasticized with a mixture comprising a monomeric phenol plasticizer and a completely esterified ester of a carboxylic acid of the formula $R_1OCOR_4OCORCOOR_2COOR_3$ in which R is a divalent hydrocarbon radical, $R_1$ and $R_3$ are monovalent saturated hydrocarbon radicals, and in which $R_2$ and $R_4$ are divalent hydrocarbon radicals of not more than 6 carbon atoms, said polyamide on hydrolysis with hydrochloric acid yielding material selected from the group consisting of (a) monoaminomonocarboxylic acid hydrochloride, (b) a mixture of diamine hydrochloride and dibasic carboxylic acid, and (c) a mixture of monoaminomonohydric alcohol hydrochloride and dibasic carboxylic acid, said mixture of phenol plasticizer and said ester being present in said composition of from 10% to 150% by weight of said polyamide, and said ester being present in said mixture in amount of from 25% to 100% by weight of said phenol plasticizer.

4. A composition of matter comprising a synthetic linear polyamide having an intrinsic viscosity of at least 0.4 plasticized with a mixture comprising a monomeric phenol plasticizer and a completely esterified ester of a carboxylic acid of the formula $R_5COOR_2COOR_1$ in which $R_1$ and $R_2$ are as defined in claim 2 and $R_5$ is a monovalent saturated hydrocarbon radical, said polyamide on hydrolysis with hydrochloric acid yielding material selected from the group consisting of (a) monoaminomonocarboxylic acid hydrochloride, (b) a mixture of diamine hydrochloride and dibasic carboxylic acid, and (c) a mixture of monoaminomonohydric alcohol hydrochloride and dibasic carboxylic acid, said mixture of phenol plasticizer and said ester being present in said composition of from 10% to 150% by weight of said polyamide, and said ester being present in said mixture in amount of from 25% to 100% by weight of said phenol plasticizer.

5. A composition of matter comprising a synthetic linear polyamide having an intrinsic viscosity of at least 0.4 plasticized with a mixture of plasticizers comprising 1,12 - di(hydroxyphenyl) octadecane and butyl carbobutoxymethyl phthalate, said polyamide on hydrolysis with hydrochloric acid yielding material selected from the group consisting of (a) monoaminomonocarboxylic acid hydrochloride, (b) a mixture of diamine hydrochloride and dibasic carboxylic acid, and (c) a mixture of monoaminomonohydric alcohol hydrochloride and dibasic carboxylic acid, said mixture of plasticizers being present in said composition in amount of from 10% to 150% by weight of said polyamide, and said butyl carbobutoxymethyl phthalate being present in said mixture in amount of from 25% to 100% by weight of said 1,12-di(hydroxyphenyl) octadecane.

6. A composition of matter comprising a synthetic linear polyamide having an intrinsic viscosity of at least 0.4 plasticized with a mixture of plasticizers comprising 1,12-di-(hydroxyphenyl) octadecane and a completely esterified ester of a carboxylic acid of the formula

R₁OCORCOOR₂COOR₃ in which R is a divalent hydrocarbon radical, R₂ is a divalent hydrocarbon radical of not more than 6 carbon atoms, and in which R₁ and R₃ are monovalent saturated hydrocarbon radicals, said polyamide on hydrolysis with hydrochloric acid yielding material selected from the group consisting of (a) monoaminomonocarboxylic acid hydrochloride, (b) a mixture of diamine hydrochloride and dibasic carboxylic acid, and (c) a mixture of monoaminomonohydric alcohol hydrochloride and dibasic carboxylic acid, said mixture of plasticizers being present in said composition in amount of from 10% to 150% by weight of said polyamide, and said ester being present in said mixture in amount of from 25% to 100% by weight of said 1,12-di-(hydroxyphenyl) octadecane.

7. The composition set forth in claim 1 in which the phenol is an alkyl ester of a fatty acid containing a hydroxyphenyl nucleus attached to the acid residue.

8. A composition of matter comprising a synthetic linear polyamide having an intrinsic viscosity of at least 0.4 plasticized with a mixture of plasticizers comprising methyl-10 - (hydroxyphenyl)stearate and butyl carbobutoxymethyl phthalate, said polyamide on hydrolysis with hydrochloric acid yielding material selected from the group consisting of (a) monoaminomonocarboxylic acide hydrochloride, (b) a mixture of diamine hydrochloride and dibasic carboxylic acid, and (c) a mixture of monoaminomonohydric alcohol hydrochloride and dibasic carboxylic acid, said mixture of plasticizers being present in said composition in amount of from 10% to 150% by weight of said polyamide, and said butyl carbobutoxymethyl phthalate being present in said mixture in amount of from 25% to 100% by weight of said methyl-10-(hydroxy phenyl) stearate.

9. A composition of matter comprising a synthetic linear polyamide having an intrinsic viscosity of at least 0.4 plasticized with a mixture of plasticizers comprising methyl-10 - (hydroxyphenyl)stearate and a completely esterified ester of a carboxylic acid of the formula

R₁OCORCOOR₂COOR₃ in which R is a divalent hydrocarbon radical, R₂ is a divalent hydrocarbon radical of not more than 6 carbon atoms, and in which R₁ and R₃ are substituents selected from the class consisting of monovalent hydrocarbon radicals and monovalent hydrocarbon radicals bearing ether groups, said polyamide on hydrolysis with hydrochloric acid yielding material selected from the group consisting of (a) monoaminomonocarboxylic acid hydrochloride, (b) a mixture of diamine hydrochloride and dibasic carboxylic acid, and (c) a mixture of monoaminomonohydric alcohol hydrochloride and dibasic carboxylic acid, said mixture of plasticizers being present in said composition in amount of from 10% to 150% by weight of said polyamide, and said ester being present in said mixture in amount of from 25% to 100% by weight of said methyl-10-(hydroxyphenyl) stearate.

GORDON T. VAALA.

REFERENCES CITED

The following references are of record in the file of this patent:

UNITED STATES PATENTS

| Number | Name | Date |
|---|---|---|
| 2,021,121 | Dykstra et al. | Nov. 12, 1935 |
| 2,214,402 | Carothers | Sept. 10, 1940 |